United States Patent Office 3,705,199
Patented Dec. 5, 1972

3,705,199
ALKALI TREATED HYDROGENATION CATALYST
Albert J. de Berardinis, Wilmington, Del., assignor to Atlas Chemical Industries, Inc., Wilmington, Del.
No Drawing. Filed Apr. 30, 1970, Ser. No. 33,496
Int. Cl. B01j *11/22;* C07c *31/18*
U.S. Cl. 260—635 C
11 Claims

ABSTRACT OF THE DISCLOSURE

An improved supported nickel hydrogenation catalyst is described as well as the method for producing this improved catalyst and the use of the catalyst in the hydrogenation of sucrose to yield a mannitol enriched hydrogenation product.

---

This invention relates to an improved supported nickel hydrogenation catalyst, to a process for preparing said hydrogenation catalyst, and to a method of preparing a mannitol enriched hydrogenation product of invert sugar. More particularly, this invention concerns a supported nickel catalyst which increases the yield of mannitol in the hydrogenation of invert sugar and which is formed when one treats a standard supported nickel catalyst with alkali at a particular stage of catalyst preparation.

Supported nickel hydrogenation catalysts are old in the art, and their use in the hydrogenation of inverted sucrose solutions to prepare the corresponding polyhydric sugar alcohols is also old in the art. However, when one uses a standard supported nickel hydrogenation catalyst, such as those used in U.S. Pat. No. 2,759,024 or in U.S. Pat. No. 3,329,729, the usual amount of mannitol obtained by the hydrogenation of inverted sucrose is from 24 to 26%. Thus, since mannitol is the desired product, a catalyst which could increase the yield of mannitol and yet not cause problems in processing during the hydrogenation of the invert sucrose would be an advance in the hydrogenation art.

It is an object of this invention to provide a supported nickel catalyst which increases the yield of mannitol during the hydrogenation of inverted sucrose and which does not cause problems in processing during hydrogenation.

It is also an object of this invention to provide a method for preparing said catalyst.

It is another object of this invention to provide an improved process for the preparation of mannitol from invert sugar.

These objects and still further objects will become apparent to those skilled in the art from the following detailed description of the invention.

In general, the process of preparing the catalysts of this invention comprises the following steps. A carrier is suspended and nickel is dissolved along with any other minor metal ingredients in an aqueous medium. Where a water-soluble nickel salt is used the medium need only be water, but if metallic nickel is used an acid medium is needed. An alkali agent is added to the medium, thus precipitating metal oxides onto the carrier and forming the inert catalyst, called the green catalyst. The slurry of green catalyst and neutralized acid medium is separated leaving a wet green catalyst product. The wet green catalyst product is then water washed. After water washing it is further washed with a weak alkali solution, wherein the alkali is a fairly water soluble alkaline agent, i.e. it can form a solution containing at least about 1% alkali. After alkali washing, the green catalyst product is then once again water washed. The green catalyst is then dried and activated in a hot reducing hydrogen stream. In forming the initial carrier-nickel solution-slurry, the order of addition is immaterial.

The chemistry of producing a supported nickel catalyst is old in the art. The following is a brief description of the chemistry involved. The nickel is dissolved in the acid medium, e.g., nitric acid, and forms nickel nitrate, a soluble salt. The nickel is then precipitated in its hydroxide form by the addition of an alkaline agent such as sodium carbonate and coats the carrier which is present in the medium. This nickel hydroxide then undergoes degradation to form nickel oxide. The nickel oxide coated carrier is the green catalyst. However, the green catalyst contains impurities; namely, some adsorbed salts of the particular acid used; therefore, it is washed with water to remove these adsorbed salts. The water washed green catalyst is then activated to form a supported nickel catalyst.

It has been found, as indicated above, that the structure of the catalyst is altered by washing or treating the water washed green catalyst with a weak alkaline solution. This alteration is evident from the fact that an alkaline wash activated catalyst preferentially causes a greater degree of formation of mannitol during the hydrogenation of inverted sucrose. Chemically, there is no apparent difference between the alkaline treated supported nickel catalyst of this invention and those prepared by standard manufacturing techniques.

The critical difference between the preparation of a standard supported nickel catalyst and the preparation used in the instant invention is the alkali washing of the green catalyst. The amount of alkaline agent which is used will naturally depend upon the amount of catalyst which is to be washed, however, the concentration of the alkali may have an effect on the catalyst. Thus although there is no minimum concentration of alkaline agent, a practical minimum concentration of alkaline agent is about a 1% solution. The reason for this lower limit is not that the effect could not be obtained by using more dilute solutions, but rather that in order to have sufficient alkali contacting the catalyst an enormous amount of solution would have to be utilized. As to a maximum concentration of alkaline agent in the wash solution, again there is no particular limit. However, depending upon the type of carrier used to support the nickel, solutions containing much more than about 6.0 percent by weight of alkaline agent may harm the carrier of the catalyst and thus harm the catalyst activity. Thus, where kieselguhr is used as a carrier, a solution containing more than about 6.0% sodium hydroxide may cause degradation of the catalyst structure. The alkaline agents used will usually be the hydroxides, oxides, or basic salts of metals in the first two periods of the Periodic Table, i.e. alkaline earth metals and alkali metals. The agents would be used from 0.05 to 1.0 pound per pound of dry green catalyst. In a preferred embodiment of this invention the amount of alkaline agent used may vary from 0.1 to 0.4 pound per pound of dry green catalyst. The preferred alkaline agents are alkali metal hydroxides, such as sodium hydroxide or lithium hydroxide.

In forming the catalyst of this invention it has been found that an optimum catalyst can be achieved when the percent nickel in the reduced catalyst is in the range of from about 17% to about 24% nickel and the catalyst is reduced in a hydrogen stream at temperatures of from about 450 to about 550° C.

The above described process can also be used in reclaiming spent supported nickel hydrogenation catalysts. Thus in reclaiming the catalyst, by dissolving the spent catalyst in an acid medium, the process steps would be identical to those outlined above and the alkaline washing of the green catalyst prepared from the spent catalyst would be at the identical stage of preparing the catalyst.

To better enable those skilled in the art to prepare the catalysts of this invention the following non-limiing examples are given:

EXAMPLE 1

4,070 pounds of nickel shot are dissolved in 18,600 pounds of a 65 weight percent nitric acid solution by heating at 80° C. for three hours. The pH of the nickel-nitric acid mixture is tested and adjusted with nitric acid so that the pH is less than 0.2 at which point all the nickel has gone into solution. After this digestion step 3,500 gallons of water and 12,350 pounds of kieselguhr are added to the solution. Then 8,000 pounds of sodium carbonate are added with agitation in the form of a 20 weight percent solution to neutralize the acid. After the addition of the sodium carbonate, the mixture is agitated for ten minutes and the pH is tested and adjusted to 7.2 with additional sodium carbonate. This mixture is held for an hour and a half at 90° C. at which point it is filtered hot, resulting in a filter cake of green catalyst. The green catalyst is then washed with 6,000 gallons of water to remove most of the soluble salts remaining on the cake. After water washing the green catalyst is washed with 6,000 gallons of a 5% sodium hydroxide solution over a period of one hour. After this amount of alkali the green catalyst is again water washed with an additional 6,000 gallons of water. At the end of the second water washing the green catalyst is removed from the filter and transferred to an activation furnace wherein it is contacted with a hydrogen stream at a temperature of 500° C. The activated catalyst is then stored under an inert atmosphere until use.

EXAMPLE 2

According to the digestion procedure of Example 1, 2,000 pounds of nickel shot is dissolved in 9,500 pounds of a 65 weight percent nitric acid solution and digested for two hours at 84° C. After the digestion step the pH is found to be less than 0.2. To the digested nickel-acid solution is then added 6,300 pounds of kieselguhr and 4,800 pounds of sodium carbonate as a 20 weight percent solution. This mixture is stirred for 12 minutes and then allowed to stand at 89° C. for one and three quarters hours, at which time the mixture is filtered and the green catalyst recovered from the mixture. The green catalyst is then washed with 3,000 gallons of water to remove excess salts. It is then further washed with 2,000 gallons of a 3% lithium hydroxide solution over the course of 45 minutes after which time the green catalyst is further washed with 4,000 gallons of water. The washed and dried green catalyst is then placed in an activation furnace and contacted with a hydrogen stream at 475° C. to activate the catalyst. The activated catalyst is then stored at room temperature under an inert atmsphere.

EXAMPLE 3

8,000 grams of spent supported nickel catalyst prepared according to Example 1 is added to 10,000 grams of a 65% nitric acid solution and to this is added 15 liters of water. This mixture of spent catalyst and nitric acid is then digested for two and a half hours at 81° C. with agitation. At this time the pH is found to be above 0.2 and an additional nitric acid is added to adjust the pH to again below 0.2 and mixture further digested at 83° C. for an additional half hour. To this mixture is then added 5,000 grams of sodium carbonate as a 20 weight percent solution and the mixture stirred for 20 minutes. After stirring the mixture is held at 93° C. for one and a half hours. The resultant regenerated green catalyst is filtered from the mixture and washed with 35 liters of water at which point it is further washed with 40 liters of a 6% sodium hydroxide solution over the course of a half hour. The green catalyst is then again water washed with 100 liters of water and removed from the filtering apparatus. The green catalyst is then dried and placed in an activated furnace and contacted with a hydrogen stream at 495° C. resulting in activated catalyst which is stored under inert atmosphere until use.

The nickel catalyst prepared according to the procedure of the present invention is an extremely good hydrogenation catalyst and has been found to increase the yield of mannitol during hydrogenation of inverted sugar. The hydrogenation process may be carried out as a batch or continuous process. From an economic standpoint it has been found that a continuous process best utilizes the particular form of supported catalyst described in this disclosure.

The continuous process usually employed uses the following general procedure. The catalyst of this invention and an inverted sucrose solution containing from about 25 to 75 weight percent inverted sucrose is fed to a series of bubble tank reactors wherein it is contacted with a hydrogen stream at a hydrogen pressure of at least 1500 p.s.i.a. The total residence time of an average portion of feed within the reactor system is usually about 1 to 2 hours. Depending upon the number of reactors in the continuous system the residence time in any one reactor may be as little as a fraction of an hour up to the entire residence time. The temperature during the course of the hydrogenation reaction may be as low as room temperature and as high as 190° C. However, for achieving economical production rates and to avoid possible charring of the sugar during the reaction, the temperature is usually kept above 100° C. and below 170° C.

The amount of nickel catalyst used in the course of a hydrogenation reaction will usually be sufficient to obtain from about 0.3 to 2.0 weight percent nickel based on sugar content of the solution. At concentrations below about 0.3 weight percent nickel the reaction will proceed slowly or possibly not at all. At concentrations above 2% nickel the catalyst would be excessive and may cause problems due to settling. A preferred range of catalyst would achieve a nickel concentration of from 0.6 to 1.1 weight percent of nickel based on sugar.

In a preferred embodiment of the subject process, the solution of invert sugar may contain from 40 to 60 weight percent of invert sugar which contains from about 85 to 97 weight percent monosaccharide, to this solution may be added from about 0.006 to about 0.011 pound of nickel in the form of a reduced supported nickel catalyst, per pound of sugar and this catalyst-aqueous inverted sucrose solution mixture may be fed continuously to a series of stirred tank type reactors. Within these reactors the catalyst sugar solution slurry may be subjected to a hydrogen pressure of from about 1600 to about 2400 p.s.i.a. at a temperature of from about 140° C. to 170° C. for a time period sufficient to reduce the sugar concentration to less than 0.5 percent.

To better enable those skilled in the art to appreciate the improved process for hydrogenating inverted sucrose when using the catalyst of this invention, the following examples are given.

EXAMPLE 4

To a 50% aqueous solution of 95% inverted sucrose is added a reduced supported nickel catalyst prepared according to Example 1 in a ratio of .006 pound of nickel per pound of sugar. This sugar slurry is fed to a series of five bubble stirred tank reactors at the rate of 19 liters per hour which results in a residence time of approximately 27 minutes per reactor. The reactors are maintained at a hydrogen pressure of 2000 p.s.i.a. and a temperature of 160° C. The resultant mixture of polyhydric alcohols is low in organic volatiles and contains 29.1 weight percent mannitol.

EXAMPLE 5

To a 50% aqueous solution of 94% inverted sucrose is added a reduced supported nickel catalyst prepared according to Example 3 in a ratio of .006 pounds of nickel per pound of sugar. This sugar catalyst slurry is then fed to a series of five bubble stirred tank reactors at a rate of 19 liters per hour, which results in a residence time of about 27 minutes per reactor. The reactors are maintained at 2000 pounds hydrogen pressure and a temperature of 160° C. The resultant product is low in organic volatiles and total residual sugars and contains 28.8 weight percent mannitol based on organic solids.

EXAMPLE 6

According to the procedure of Example 4, a 60 weight percent sugar solution of 97% inperted sucrose and .011 pound of nickel as a reduced supported nickel catalyst prepared according to Example 2 are mixed together and fed to the reactors at a rate of 21 liters per hour. The reactors are maintained at a hydrogen pressure of 2200 p.s.i.a. and at a temperature profile of 140° C. in the first reactor, 150° C. in the second through fourth reactor and 170° C. in the final reactor. The product is a mixture of polyhydric alcohols which is low in volatiles and total residual sugars and contains more than 28% mannitol based on organic solids.

It is obvious to those skilled in the art that the above results show a dramatic improvement in the amount of mannitol obtained from hydrogenation of inverted sucrose when the catalyst of this invention is used. The advantage of using this particular catalyst is also obvious since no variation of conditions and no addition of other components such as acids or bases is needed during the hydrogenation process. Thus, this catalyst allows a simple process and economical throughput rates.

Having thus described the invention the following is claimed:

1. A process for preparing a supported nickel hydrogenation catalyst which comprises dissolving nickel or nickel salts in an aqueous medium and suspending an inert carrier in said aqueous medium, precipitating the nickel from solution onto the inert carrier by the addition of an alkaline agent selected from the group consisting of hydroxides, oxides, and basic salts of alkali metals and alkaline earth metals to form an inactive green catalyst, then separating the green catalyst from the slurry, washing the green catalyst with sufficient water to remove substantially all of the salts, drying the washed green catalyst, and activating the green catalyst to an active hydrogenation catalyst by contacting it with a hot hydrogen stream in a reducing furnace, wherein the improvement consists of washing the green catalyst prior to activation but after an initial water wash with an aqueous solution of an alkaline agent selected from the group consisting of hydroxides, oxides, and basic salts of alkali metals and alkaline earth metals and then further water washing the green catalyst.

2. A process according to claim 1 wherein the green catalyst is washed with sufficient aqueous alkaline solution to result in from 0.1 to 0.4 pound of alkaline agent being contacted per pound of nickel catalyst.

3. A process according to claim 1 wherein said alkaline agent is used as a 1 to 6 weight percent solution.

4. A process according to claim 2, wherein said alkaline agent is used as a 1 to 6 weight percent solution and is selected from the group consisting of sodium hydroxide and lithium hydroxide.

5. A catalyst composition prepared according to the process of claim 1.

6. A catalyst composition prepared according to the process of claim 2.

7. A catalyst composition prepared according to the process of claim 4.

8. A process for the preparation of mannitol from invert sugar by contacting an aqueous solution of invert sugar with hydrogen at elevated temperature and pressure and in the presence of a supported nickel catalyst wherein the improvement comprises using a catalyst of claim 5.

9. A process for preparing mannitol according to claim 8 wherein the temperature is from about 100° C. to about 170° C. and the hydrogen pressure is at least 1500 p.s.i.a.

10. A process according to claim 9 wherein sufficient catalyst is used to achieve a nickel concentration of from 0.3 to 2.0 weight percent nickel based on the weight of sugar in solution, and said hydrogen pressure is from about 1600 to about 2400 p.s.i.a.

11. A process according to claim 9 wherein sufficient catalyst is used to obtain a nickel concentration of from 0.6 to 1.1 weight percent nickel based on the weight of sugar, said temperature is from 140° C. to 170° C., and the concentration of said sugar solution is from 40 to 60 weight percent solids of which from 85 to 97% is monosaccharide.

References Cited

UNITED STATES PATENTS

| 2,140,400 | 12/1938 | Faulkner | 252—472 X |
| 2,280,975 | 4/1942 | Power | 260—635 C |
| 2,759,024 | 8/1956 | Kasehagen et al. | 260—635 C |
| 3,329,729 | 7/1967 | Brandner et al. | 260—635 C |

FOREIGN PATENTS

| 392,600 | 7/1932 | Great Britain | 252—472 |

DANIEL E. WYMAN, Primary Examiner

W. J. SHINE, Assistant Examiner

U.S. Cl. X.R.

252—472, 474; 127—41